_United States Patent_ [19]

Lewis et al.

[11] 4,384,009

[45] May 17, 1983

[54] METHOD OF MANUFACTURING DEHYDRATED MEAT PRODUCT

[76] Inventors: Victor M. Lewis; David A. Lewis, both of 19 Boundary St., Rushcutters Bay NSW, Australia

[21] Appl. No.: 273,744

[22] Filed: Jun. 15, 1981

Related U.S. Application Data

[63] Continuation-in-part of Ser. No. 79,536, Sep. 27, 1979, abandoned.

[30] Foreign Application Priority Data

Oct. 3, 1978 [AU] Australia ............................... PD6209

[51] Int. Cl.³ ........................... A23L 1/31; A23B 4/00
[52] U.S. Cl. .................................. 426/646; 426/331; 426/513; 426/465; 426/410
[58] Field of Search ............... 426/646, 331, 326, 532, 426/513, 517, 465, 805

[56] References Cited

U.S. PATENT DOCUMENTS

| | | | |
|---|---|---|---|
| 3,653,908 | 4/1972 | Buck et al. | 426/646 |
| 3,745,021 | 7/1973 | Van Middlesworth et al. | 426/646 |
| 3,934,050 | 1/1976 | Hawkins | 426/646 |
| 4,054,674 | 10/1977 | Barker et al. | 426/805 |
| 4,057,650 | 11/1977 | Keszler | 426/646 |

_Primary Examiner_—Raymond N. Jones
_Assistant Examiner_—George C. Yeung
_Attorney, Agent, or Firm_—Darby & Darby

[57] ABSTRACT

The invention provides a method of producing an edible dehydrated meat product having a water activity level of between 0.7 and 0.85. According to the method 40-90% by weight of raw meat pieces are intimately mixed with 10-60% by weight of vegetable materials to form a stiff cohesive mixture adding during mixing one or more substances such as salt alone or salt in combination with dextrose, sucrose or fructose, or hydrolysed plant proteins to reduce or control the water activity in the final product. Thereafter the mixture is formed into a sheet or an extrusion and dried to produce a intermediate moisture product that is bacteriologically stable at a moisture content of 15-45%.

8 Claims, No Drawings

METHOD OF MANUFACTURING DEHYDRATED MEAT PRODUCT

This is a continuation-in-part of U.S. patent application Ser. No. 79,536 filed Sept. 27, 1979 and entitled "Dehydrated Meat Product", now abandoned.

This invention relates to a method of producing a dehydrated meat product and to a dehydrated meat product produced according to such method.

Dehydration of meat is a method of meat preservation, which has certain advantages over other forms of meat preservation. Canning of meat has the disadvantages of high costs of canning, large energy requirements to sterilize the product and the sheer weight of the canned product (which may contain 75-80% moisture) which subsequently increases freight costs. Chilling or freezing of meat requires sophisticated handling systems, which are not readily available to most people in developing countries.

Dehydrated meat, on the other hand, does not require refrigeration, and is convenient to freight and distribute.

In the past, dehydrated or dried meat products have been prepared in various ways. According to one such method, thin slices of meat are dehydrated or dried with the aid of hot air. In this method, thin slices of meat are exposed to hot air with or without the use of smoke and additives, such as salt and spices. Such methods are slow, they are not suitable for large scale production and the quality of the finished product has left much to be desired.

According to another method, mechanical systems of dehydration have been employed. In these methods, the meat is sliced, diced or chopped into relatively small pieces mixed with diced vegetable pieces and other ingredients and subjected to drying in a drying chamber to a moisture content of below 10%. However, moisture is lost extremely slowly and the energy needed to effect dehydration or drying to a satisfactory degree is considerable. The consumption of energy in these methods is quite high and because of the problems associated with drying, the final product is extremely hard and has only proved useful as an ingredient in soup mixes.

According to a still further method, meat is dehydrated by heating in an edible oil or fat under vacuum. This process has the disadvantages of being expensive to operate and of requiring high cost capital equipment.

Many methods have been suggested for extending meats. Breadcrumbs, eggs potatoes, cooked rice, etc. are common "in home use" extenders. More recently vegetable proteins, including textured vegetable proteins have been extensively used. The more economical soy proteins suffer from a "beany" taste, while the more highly refined soy proteins approach the actual cost of meat itself. In the area of dried meats, methods of production have been suggested using vegetable proteins, dried potatoes, potato fibre, starches, etc. These methods start with either a slurry-type mix which is roller-dried to produce a beverage-type powder or flake or a stiff cake which can only be dried by long exposure to hot air. In all cases the moisture content of such products must be reduced to levels where the product is bacteriologically stable. This entails a lengthy and expensive dehydration phase. This means the moisture content of such products must be reduced to about 3-10%. This means that the final product is in an extremely dry brittle state which is difficult to store without cracking and breaking into small pieces and the product requires rehydration before consumption. It is well known that microorganisms require water for growth and it is for this reason that the processes of producing dehydrated meat products as used in the past have all entailed the mentioned lengthy and expensive drying phase.

Over recent years various types of intermediate moisture meat-containing pet food products have appeared on the market. These, for the most part, are at water activities above 0.90, and depend for their shelf-stability on the generous use of preservative agents such as polyhydric alcohols, sorbic acid or sorbates etc. Additionally, they contain high levels of sugars, usually above 10%, a level which is unacceptable for human consumption.

A major problem in all dried meat products has been an unsatisfactory flavor profile. The lipids and other labile ingredients in meats are very sensitive to oxidation and most existing methods for the dehydration of meats involve long drying times at elevated temperatures, usually for 5 hours or more. During this long drying time, irreversible flavor changes occur.

An object of the present invention is to provide a simple, yet efficient low cost method of producing a dehydrated meat product, which overcomes the problems mentioned above and at the same time provides a product of consistent high quality with good shelf-life.

The products produced according to the present invention have the advantage of being very much cheaper than those produced by methods used hitherto. The water activity levels and the moisture content levels of the product produced according to this invention are much higher than has been possible with dehydrated meat products used in the past which means that the products of the invention require less drying and so effect considerable savings in terms of time and energy used in the dehydration step and at the same time produce a commercially viable product which may be eaten as a snack "as is" without cooking or further preparation. Tenderness or chewiness may be controlled in manufacture by varying the fat and moisture content. The products rehydrate rapidly in a few minutes when cooked or when boiling water is added and for this reason are excellent ingredients for incorporation in soup, casserole, rissotto or instant noodle mixes. They can be rapidly fried for serving in the form of breakfast bacon and can be used as toppings for pizzas and other specialty products. Because of their stability after manufacture, they can be distributed and stored without refrigeration and have particular application in those situations where refrigeration is not readily available.

The present invention broadly provides a method of producing an edible dehydrated meat product having a water activity level of between 0.7 and 0.85 wherein about 40-90% by weight of raw meat pieces are intimately mixed with about 10-60% by weight of vegetable materials or dried or semi-dried meat products to form a stiff cohesive mixture, adding to the formulation during mixing one or more substances to reduce or control the water activity in the final product, forming said mixture into a sheet or an extrusion and subsequently drying said sheet or extrusion to produce an intermediate moisture product that is bacteriologically stable at a moisture content of 15-45%. The present invention also provides a dehydrated meat product, produced by such process.

The term "meat" as used herein is to be understood as meaning all raw flesh of fowl, fish (including shell fish) and animal origin which is customarily used as food.

The term "vegetable material" as used herein is to be understood as meaning:

(1) whole or nearly whole grains or seeds, for example, wheat, barley, rice, rye, maize, oats, dry legumes and pulses, and which have been rolled, ground, flaked, cracked or puffed, either substantially ungelatinized or gelatinized.

(2) edible plant derived materials, for example, protein meals, concentrates and isolates, brans, semolinas, yeast grits, sago, tapioca and arrowroot, and (3) dehydrated edible plant materials, for example, dehydrated vegetables (potato granules, dried onions, cassava and manioc).

The expression dried or semi-dried meat products may be "cracklings" or meat fractions.

Water activity is dependent not only on the amount of moisture present but also on the amounts of various other substances present in a complex interlocking system. Certain substances in foods have more marked effects on the water activity of a food and when present enable the production of microbiologically stable foods at higher moisture contents than would otherwise be possible. This is because it is the water activity, rather than the moisture content which determines whether micro organisms will grow on a food to cause spoilage.

The expression $a_w$ is used to describe water activity level. $a_w = p/p_o$ where p=vapour pressure of the solution or food and $p_o$ is the vapour pressure of water.

Certain dried or semi-dried meat products may replace the vegetable content of the final product. These meat products as previously stated may be "cracklings" or meat fractions which when mixed with the comminuted meat produces a texture which enables the mixture to be successfully sheeted or extruded.

Meat flesh may be derived from off-cuts or may be obtained from the mechanical removal of flesh during trimming of bones and therefore may contain a substantial quantity of connective tissue.

The meat may also contain relatively high proportions of fats. In contrasts, the meat used in conventional dehydration methods, usually has a low proportion of fat. In the present method, pork-meat with a fat content as high as 40% has been found to be suitable. Moreover, where lean meat is used, it is often desirable to add up to 30% by weight of fat to the meat, prior to or during the mixing operation. This additional fat may be of animal or vegetable origin.

The addition of fat gives the following advantages:

(i) It gives a more tender and juicier product, often with a better flavour and mouth feel.

(ii) The percentage yield on drying is substantially increased thereby giving a more economical product.

(iii) During processing and drying, the fat is substantially absorbed by the vegetable particles and imparting to them a highly desirable nutty texture and flavour.

The additives to reduce or control the water activity of the final product comprise any one or more of the following (percentages indicated referred to the percent by weight of the dehydrated or finished product): 2–8% salt with or without the addition of sugars including dextrose, sucrose and fructose in proportions of 0–5% and hydrolyzed plant proteins and their derivatives in proportions of 0–5%.

It is preferred, however, to use a mixture which will be present in the dehydrated product as follows: 2–8% salt, 1–3% dextrose or sucrose and 1–5% hydrolyzed plant proteins and their derivatives.

Sugar levels above 5% are objectionable from a flavor point of view. Excessive sweet flavors in meat products are not compatible with human taste expectations.

The meat and vegetable is first reduced to the desired particle size. The meat is preferably reduced to the particle size of from 3–15 mm and the vegetables are reduced if necessary to a particle size of from 2–8 mm.

The equipment which is used to mix the meat and vegetable pieces may be any conventional mixing equipment. A bowl-chopper which is used extensively in the meat industry is preferred. It is essential that the meat-vegetable mixture has a cohesive texture and to achieve this end, it may be necessary to add water. The use of uncooked meat has importance in connection with the texture of the finished product. During sheeting or extrusion, raw meat provides cohesion and strengthens the sheet or strand. Moreover, during drying and denaturation, the web or extrusion becomes strong and develops a firm, chewy texture typical of semi-dried sausage products.

The additives are added to the meat and vegetable mixture during mixing and are thoroughly mixed with the meat and vegetable. If desired, further additives such as fats, oils, seasonings, flavours, preservatives, emulsifiers, anti-oxidants, nutritional supplements or colouring matter may also be added to the mixture. The incorporation of such further additives is optional and their presence is in no way essential to the performance of the invention.

If the final water activity of the product is below 0.85 a figure below which bacteria will not grow, and the product is properly stored or packaged, the use of preservatives or anti-mycotics is not necessary. The use of nitrite to produce a desirable colour and the use of ascorbic acid or its salts or isomers to control colour and oxidation in meats are acceptable in preparing human foods. While their use is not essential to the invention, the use of nitrite in red meats is considered desirable, and likewise, the use of sodium erythorbate has been found to improve flavor.

Where packaging of the finished product is not such as to exclude oxygen, the use of an antimycotic would be desirable to prevent mold growth. The exclusion of oxygen by vacuum packaging or gas flushing in low oxygen transmission flexible packaging materials is the preferable form of distribution.

The meat-vegetable mixture at the time of sheeting or extruding should have the consistency of a stiff putty or dough. This is necessary to allow proper sheeting or extrusion and to give a final product with the necessary textural characteristics. The texture of the dried meats prepared by the method according to the invention is different from the types of dried products which may be prepared in the form of flakes on roller-drying equipment from a mix which has very much lower viscosity. Such flake type products are mainly suitable for the preparation of suspension, broths etc.

After the mixing step, the mixture according to one form of the invention is passed through sheeting equipment preferably rollers and more preferably rollers which are coated with non-stick material such as teflon or other suitable plastics. The resultant sheet, in the form of a web or band, has a thickness of between 0.5 and 5.0 mm preferably between 1 and 3 mm.

Webs having a thickness greater than 5 mm or less than 0.5 mm have been found to be unsuitable for sheeting. A web less than 0.5 mm in thickness is fragile and is not self-supporting, which creates problems in the handling and subsequent processing of the web. A web with a thickness greater than 5 mm requires an excessively long drying time.

In certain instances it may be necessary to use multi-stage sheeting equipment. After leaving the sheeting equipment the web may be sprinkled on the surface with a predetermined quantity of seeds such as sesame seeds, poppy seeds or celery seeds, with flakes of dried onion, dried red peppers, leeks or coconut, with diced pieces of nuts, candied fruit or citrus peel or any other suitable wholesome food product.

These are pressed into the surface of the web by an additional light rolling and pass through the drying process as an integral part of the product. The use of these various additives gives good visual appeal to the surface of the finished product, as well as giving good taste and texture appeal, and produces a finished product that has sales appeal as a snack food or sandwich slice.

According to another form of the invention the mix can be extruded in conventional extruding equipment such as a pasta press fitted with appropriate dies and cutting knives. In this case the mixture may be somewhat stiffer, i.e. one containing less water or less fat or a higher percentage of vegetable material to produce pieces of meat mix of square section between 0.5–10 mm thickness in flat ribbons or in round or eliptical strands and cut to any appropriate length to form cubes, balls, "quenelles", or other shaped pieces.

As the shaped extrusions present a greater surface to the drying medium they can be substantially thicker than the webs. It has been found, however, that where the maximum section of the extruded mixture is greater than 10 mm, the drying time becomes extended and the economy of rapid throughput becomes less advantageous. With a section of 10 mm the drying time at 80° or 90° C. is still less than 40 mins. to achieve a water activity in a desired formulation of 0.80 or less.

Under certain circumstances it is desirable to extrude the mix into the form of a fairly thick band, for example 10–20 mm thick, which band is then reduced to the finally desired thickness by passing through sheeting equipment.

The meat-vegetable mix, after leaving the sheeting equipment or the extruder is conveyed, preferably by means of a continuous belt, to a dehydrator.

Any conventional dehydrator may be used for the dehydration of the meat-vegetable product. Suitable dehydrators include, for example, cabinet dryers, continuous belt dryers and vacuum dryers or for the extruded pieces, fluid bed driers. Smoke may be applied by conventional means, to the meat prior to or during the drying process.

We have also found it desirable but not essential, to denature or "set" the protein in the meat before drying. This may be done before the meat enters the drying equipment by the use of radiant heat, microwave energy or use of heated rollers, etc., or by adjusting the temperature and air-flow during the early stages of drying in the actual drying equipment. The meat is denatured by heating to a temperature of 60°–110° C. Some of the advantages of denaturing are:

(i) The web is made less fragile and easier to handle through continuous equipment.

(ii) The heating process achieves a high degree of pasteurization resulting in a lower microbiological count.

(iii) The meat is immediately rendered less sticky and adhesive.

(iv) Where nitrite is used in the formulation, good color development is rapidly achieved.

It has been found that efficient drying will be achieved by employing a moderate air flow at a temperature of between 60° and 110° C. Denaturation of protein occurs at this temperature range and the result is the formation of a stable meat-vegetable sheet which is convenient to handle.

The drying temperature is not, however, limited to the 60° to 110° C. range. It is merely the preferred range as drying at this temperature range ensures that most pathogenic organisms are destroyed. If the circumstances, such as in vacuum drying, dictate a lower temperature, a lower temperature range may be used. For special requirements a higher temperature may be required.

The mentioned addition of 10%–60% by weight of vegetable or dried animal protein material is essential to the success of the drying step. The vegetable material or dried animal protein material, because of its pervious nature, is able to rapidly lose moisture. Because it is intimately mixed with the meat, the vegetable or dried meat based material continues to absorb moisture from the meat and to lose that moisture to the atmoshphere of the dehydrator. The vegetable material also appears to absorb fat from the meat, which, upon becoming liquid at the temperature of the dehydrator diffuses readily into the vegetable material or dried animal protein material. Moisture is also lost from the surface of the sheet or extrusion which has a high surface area to volume ratio (the preferred maximum thickness being 5 mm for sheeting or 10 mm for extruded sections).

The required extent of drying depends on several factors, but primarily the water activity necessary in the finished product, which in turn is governed by the purpose for which the product is to be used. The products are dried to a water activity level between 0.70 and 0.85. This involves removal of from 25 to 35% of the moisture present in the mix. Without a substantial removal of water by drying, excessive amouns of sugars or other additives would be necessary to achieve this range of water activity levels. It has been found that the nature and amount of additives used influences the dehydration process and final water activity. If salt, curing salts or sugar, or a combination thereof, are incorporated in the mixture, the drying may be less than where salts and/or sugar are not used.

The drying time will depend on the temperature of the dehydration process and, in addition, on the thickness of the sheet or extrusion. As an example, a composition comprising beef and cereal added at about 30% by weight dries in about 15 minutes at 70° C. when the thickness of the sheet is 1 mm.

When the thickness of the sheet was increased to 5 mm, having the same composition the drying time increases substantially requiring 80–90 minutes.

It will be apparent to persons experienced in food dehydration processes that generally speaking drying time increases with increasing temperature, allowing always that the temperature is not detrimental to the product. Work done with a particular beef-cereal composition has shown this effect. For example, for a sheet of such mixture prepared to a thickness of 1.5 mm drying times were 45 minutes, 25-30 minutes, 15 minutes and 8-10 minutes as the temperature used for drying was raised from 65° C. to 80° C. to 90° C. and to 100°-105° C. respectively.

It is important for reasons other than economy to keep the drying time as short as possible. The principal reason is that the longer meats are kept at elevated temperature, the greater the flavor changes that occur. These flavor changes are not only oxidative in nature, but result also from Maillard-type reactions which give rise to cooked, toasted or burned flavors. It is therefore of considerable advantage to dry the meat in the form of a relatively thin sheet or an extruded section with a high surface area to weight ratio so that drying times may be kept to a minimum.

After drying, the sheet of dried meat product may be cut into pieces of required dimensions. This step is optional as the product may be left in the form in which it leaves the dehydrator; e.g., in the form of a sheet or an extrusion. In this dried form, it may be eaten out of hand, as a snack. It may also be used as a sandwich filling or it may be cooked. Its applications in cooking are numerous. As examples, the meat product may be used as an additive to casseroles and soups, or as part of the topping to pizzas. It may be added to salads, or grilled or fried in the manner of bacon. Special dietary versions incorporating poly-unsaturated fats or other special additives may be prepared.

The ability to produce dried meat products with a relatively high moisture content has advantages beyond those of cost saving. The products with a high moisture content have a more desirable texture and mouth feel, have higher degree of protection from oxidative rancidity, are able to be reconstituted much more rapidly and hold their shape, form and texture after cooking. They are suitable "as is" for eating out of hand as a snack. In contrast, the conventional types of dried meat products which have moisture contents between 3% and 10% are in general tough, dry or crumby in texture, cannot be conveniently eaten without rehydration, and are relatively slow to rehydrate.

During cooking, the dried meat products rapidly absorb moisture and have an attractive appearance, flavor and texture. They may also be used in the dried form, as an additive to dried food mixes such as soup mixes, grain mixes etc.

Because the final product is a mixture of meat and vegetable it has some nutritional advantages over meat per se. The addition of vegetable material is beneficial as it reduces the fat content of the product, compared to meat per se. The other benefits of the vegetable material include additional vitamins, minerals and fibre which are present in the vegetable material.

By reducing the water activity of the product to below 0.85, the growth of all types of bacteria are effectively prevented. However molds will grow at water activites as low as 0.60. As it is not practical to reduce meat products to water activities sufficient to eliminate all mold growth, the growth of mold is best prevented by eliminating oxygen from the environment of the product. This can be achieved by packaging the meat in essentially oxygen impermeable packaging materials either under vacuum, or by gas flushing the packages with nitrogen, carbon dioxide or other inert gases. The elimination of oxygen allows excellent flavor retention in the products at ambient temperatures for periods up to and longer than 12 months.

The method according to the invention is illustrated by the following examples:

EXAMPLE 1

Beef Jerky 5000 g Boneless Beef, Fat content 30%
1500 g steamed rolled rice
150 g salt
100 g sucrose
100 g food yeast
50 hydrolyzed plant protein powder
50 g seasoning mix
6 g sodium erythorbate
1 g sodium nitrate The meat was coarsely chopped through an 8 mm plate and placed in a bowl-cutter. The rice, which had previously been steamed, rolled to an 0.5 mm flake and dried to 12% moisture, was added, together with the rest of the ingredients. The moisture content of the mix was approx. 49%.

The cutter was operated until a cohesive blend of ingredients had been achieved. The beef was not chopped too finely and the particles of rice were still clearly visible.

The mix was then sheeted through rollers for forming into a web of 1.5 mm thickness. The web was transferred to trays which were inserted into a cross flow drying cabinet with an air temperature of 90° C.

Drying was continued until the moisture content of the sheet was 25% by weight. The drying process took approx. 15 minutes. The water activity of the product after drying was 0.75.

After cooling, the sheet was cut into strips 20 mm wide by 100 mm long, and these were vacuum packed into foil laminated bags for storage at ambient temperatures.

EXAMPLE 2

Simulated Bacon 5000 g Boneless pork trimmings, fat content 35%
1400 g Flaked wheat
200 g Salt
150 g Sucrose
150 g Skim Milk Powder
50 g Hydrolysed plant protein powder
30 g Monosodium glutamate
15 ml Liquid smoke essence
6 g Sodium erythorbate
1 g Sodium nitrite The method of preparation and drying was similar to Example 1, except that the mix was rolled to a thickness of 2.0 mm. The moisture content of the mix was 42%. After 25 min. in the dehydrator at 85° C., and cooling, the water activity of the sheet was 0.83 and the moisture content 32%.

The sheet was cut into strips 30 mm × 150 mm, and packed under vacuum in flexible pouches.

EXAMPLE 3

Bacon Sticks 5000 g Boneless pork trimmings, fat content 35%
1400 g Flaked Wheat
200 g Salt
150 g Sucrose
150 g Skim Milk Powder
50 g Hydrolysed plant protein powder 30 g Monosodium glutamate
15 ml Liquid smoke essence
6 g Sodium erythorbate
1 g Sodium nitrite Following the same method of mixing as outlined in Example 1 the mix was extruded through an orifice to produce a pencil-like rod having a diameter of 8 mm and then cut into pieces having a length of 120 mm. These rods were placed on trays as in Example 1 and were held in the dehydrator at 108° C. for one hour. On cooling, the water activity of the rods was 0.82 and the moisture content was 30%.

The rods were packed individually in flexible laminated aluminium foil pouches with an internal atmosphere of nitrogen.

EXAMPLE 4

Fish Snacks 4600 g Whitefish fillets
1400 g Flaked wheat
400 g Hydrogenated vegetable oil
180 g Salt
50 g Sucrose
30 g Hydrolysed plant protein powder
20 ml Liquid smoke essence
20 g Monosodium glutamate
5 g Coarse ground black pepper The vegetable oil was melted and added to the bowl of a chopper along with all the other ingredients. The machine was operated until a cohesive blend was obtained. The moisture content of the mix was 54%.

The mix was sheeted to a thickness of 1 mm, placed on trays and dried at 80° C. for 20 minutes. The final moisture content was 20% and the water activity 0.80.

The sheet was cut into strips 20 mm × 100 mm and vacuum sealed in laminated foil pouches.

It was found however that a better flavor resulted when the drying temperature was lowered to 60°–65° C., even though the drying time then required was 40 minutes.

EXAMPLE 5

Chicken Jerky 5000 g Deboned raw chicken meat
1400 g Wheat flakes
160 g Salt
100 g Food yeast
50 g Dextrose
50 g Hydrolysed plant protein powder
30 g Monosodium glutamate
30 g Seasoning
6 g Sodium ascorbate The chicken meat was chopped through an 8 mm plate and mixed with all the other ingredients. The mass was sheeted to a thickness of 2.5 mm and dried for 30 mins. in the dehydrator at 85° C., after which time the moisture content was 31% and the water activity 0.84.

The cooled material was cut into sqaures 800 mm × 800 mm and vacuum packed in foil laminated pouches.

EXAMPLE 6

Soup Balls or Quenelles 5000 g Beef—36% fat
1200 g Steamed rolled wheat
400 g Rolled oats
260 g Salt
150 g Dextrose
100 g Hydrolysed plant protein powder
50 g Onion powder
30 g Seasoning mix
10 g Potassium sorbate
6 g Sodium erythorbate
1 g Sodium nitrite
10 g Garlic powder The beef was chopped through an 8 mm plate and mixed with the other ingredients in a bowl chopper.

The mixture, which was quite stiff, with a moisture content of 48%, was transferred to a pasta extruder fitted with a die with 7 mm holes. The cutter was set to cut the extruded pieces into approx. 10 mm lengths.

The pieces were dried in a through-bed drier for 40 mins. at 90° C., after which the moisture content was 27% and the water activity 0.76.

The pieces were packed in nitogen in cans, for use for addition to soups. On boiling in water or soup, the pieces reconstituted in 3-5 mins. to a tender texture. The inclusion of potassium sorbate would protect against mold if held for some time after opening the package.

EXAMPLE 7

All Meat Beef Jerky 3500 g Beef, chopped, 15% fat
1500 g "Beef Fractions" extracted beef (50% moisture)
150 g Hydrolysed plant protein powder
150 g Sucrose
100 g Salt
100 g Onion powder
60 g Seasoning
5 g Sodium erythorbate
1 g Sodium nitrite All ingredients were thoroughly mixed and worked in a bowl chopper. The moisture content was 55%. The mixture was rolled to a sheet thickness of 2.0 mm, and transferred to the trays of a dryer, where they were dried to a moisture content of 28%. Drying time was 25 minutes and water activity of the finished product was 0.79.

The product was packed in strips in vacuum sealed pouches.

EXAMPLE 8

All Meat Beef Jerky 3500 g Beef, chopped, 15% fat
1500 g "Beef Fractions" extracted beef (50% moisture)
150 g Hydrolysed plant protein powder
150 g Sucrose
100 g Salt
100 g Onion powder
60 g Seasoning
5 g Sodium erythorate
1 g Sodium nitrite.

Following the same method of mixing as outlined in Example 7 the mixture was rolled to a sheet thickness of 5 mm and transferred to the trays of a dryer, where the product was also dried to the same moisture content and water activity as above. The drying time was 1 hour 25 minutes, the temperature of drying being held at 70° C.

On cooling, the sheet was slit into strips 10 mm wide by 100 mm long and vacuum sealed in laminated aluminium foil pouches.

What is claimed is:

1. A method for producing an intermediate moisture dehydrated meat product free of chemical preservatives and having a mosture content of between about 15 and about 45 percent and a water activity level of between about 0.7 and 0.85 which comprises:

forming a cohesive mixture of about 40–90% by weight raw meat pieces and 10–60% by weight edible, pervious, water absorbent material selected from the group consisting of vegetable materials, dried meat products and semi-dried meat products, to provide a formulation of raw materials having a consistency such that it can be formed into sheets or extruded;

adding to the formulation of raw materials during mixing an additive including salt with or without an agent selected from the group consisting of sugar, sugar derivatives and hydrolyzed plant proteins, the amount of said additive being such that after dehydration the about of salt in the product will be between 2 and 8% by weight and the amount of sugar will be less than 5% by weight;

forming from the formulation of raw materials one or more shapped uncooked pieces between about 0.5 and 10 mm thick;

dehydrating the shaped uncooked pieces by elevating their temperature to about 70° C. for a period of time adequate to reduce the water activity level to between about 0.70 and 0.85 and the moisture content to between 15 and 45%; and packaging the dehydrated pieces in a substantially oxygen free environment and in the absence of chemical preservatives.

2. A method as described in claim 1, further comprising reducing the raw meat pieces to a particle size of from about 3 to 15 mm before mixing.

3. A method as described in claim 1 wherein the water activity controlling additive includes sugar selected from the group consisting of dextrose, sucrose and fructose, and present in the dehydrated pieces in an amount between 1 and 5% by weight.

4. A method as described in claim 1 wherein after dehydration the amount of additive in the pieces includes about 1–5% by weight sugar selected from the group consisting of dextrose, sucrose and fructose and about 1–5% by weight hydrolyzed plant protein and its derivatives.

5. A method as described in claim 1, wherein the formulation is shaped by passing it through extruding equipment.

6. A method as described in any one of claims 1–5, wherein the pieces are dehydrated at a temperature between 60° C. and 110° C. for no more than ninety minutes.

7. A method for producing an intermediate moisture dehydrated meat product free of chemical preservatives and having a moisture content of between about 15 and about 45 percent and a water activity level of between about 0.7 and about 0.85 which comprises:

forming a cohesive mixture of about 40–90% by weight raw meat pieces and 10–60% by weight edible, pervious, water absorbent material selected from the group consisting of vegetable materials, dried meat products and semi-dried meat products, to provide a formulation having a consistency such that it can be formed into sheets or extruded;

adding to the formulation during mixing a water activity controlling additive including salt, sugar, and hydrolyzed plant proteins, the amounts thereof being selected such that after dehydration they are present in amounts of about 2–8% by weight salt, 1–3% sugar and 1–5% hydrolyzed plant proteins;

forming the formulation uncooked into elongated thin strips between about 1 and 3 mm thick; and dehydrating the strips by elevating their temperature to between 70° C. and 90° C. for about one half hour or less to reduce the water activity level to between about 0.70 and 0.85 and the moisture content to between 15 and 45%.

8. A method as described in claim 7 further comprising reducing the raw meat pieces to a particle size of from about 3–15 mm and the selected water absorbent material to a particle size of from about 2–8 mm before mixing.

* * * * *